(12) United States Patent
Bernt et al.

(10) Patent No.: US 10,875,254 B2
(45) Date of Patent: Dec. 29, 2020

(54) METHOD FOR JOINING TWO FIBRE-REINFORCED PLASTIC COMPONENTS

(71) Applicant: TESA SE, Norderstedt (DE)

(72) Inventors: Stephan Bernt, Hamburg (DE); Uwe Michel, Norderstedt (DE)

(73) Assignee: TESA SE, Norderstedt (DE)

( * ) Notice: Subject to any disclaimer, the term of this patent is extended or adjusted under 35 U.S.C. 154(b) by 8 days.

(21) Appl. No.: 15/758,876

(22) PCT Filed: Sep. 7, 2016

(86) PCT No.: PCT/EP2016/071091
§ 371 (c)(1),
(2) Date: Mar. 9, 2018

(87) PCT Pub. No.: WO2017/042219
PCT Pub. Date: Mar. 16, 2017

(65) Prior Publication Data
US 2019/0030828 A1     Jan. 31, 2019

(30) Foreign Application Priority Data
Sep. 10, 2015 (DE) .......................... 10 2015 217 310

(51) Int. Cl.
*B29C 65/00*     (2006.01)
*B29C 65/48*     (2006.01)
(Continued)

(52) U.S. Cl.
CPC ............ *B29C 65/483* (2013.01); *B29C 65/54* (2013.01); *B29C 66/02* (2013.01);
(Continued)

(58) Field of Classification Search
CPC ..... B29C 65/483; B29C 65/54; B29C 65/542; B29C 66/02; B29C 66/1122;
(Continued)

(56) References Cited

U.S. PATENT DOCUMENTS 3,431,157 A    3/1969   Mack
4,015,035 A    3/1977   Blad et al.
(Continued)

FOREIGN PATENT DOCUMENTS

DE      3838524 A1    5/1990
DE    10149077 A1    4/2003
(Continued)

OTHER PUBLICATIONS

International Search Report for corresponding application PCT/EP2016/071091 dated Jan. 5, 2017.
(Continued)

*Primary Examiner* — Mark A Osele
*Assistant Examiner* — Nickolas R Harm
(74) *Attorney, Agent, or Firm* — Norris McLaughlin, P.A.

(57) ABSTRACT

The invention relates to a method for connecting two fibre-reinforced plastic components, comprising the following steps: producing a first fibre-reinforced plastic component, wherein a fabric made of fibrous matting is provided, which is impregnated with a resin-curing agent mixture, which is then subsequently cured, wherein the part of the surface of the first fibre-reinforced plastic component, which is to be later adhered to the second fibre-reinforced plastic component (hereinafter also referred to as joining surface), is masked with an adhesive strip before the impregnation of the fibrous matting with the resin-curing agent mixture; producing a second fibre-reinforced plastic component using the above steps, wherein the part of the surface of the second fibre-reinforced plastic component, which is to be later
(Continued)

adhered to the first fibre-reinforced plastic component, is also masked with an adhesive strip before the impregnation of the fibrous matting with the resin-curing agent mixture; removing the adhesive strips from the two finished fibre-reinforced plastic components; bringing the two joining surfaces in contact; introducing a resin-curing agent mixture between the two joining surfaces; curing the resin-curing agent mixture, wherein the adhesive strip has a carrier film, on one side of which an adhesive mass, in particular self-adhesive mass is applied, and wherein the carrier film consists of fluoropolymers, polyethylene polymers, undrawn polypropylenes or of metal, and the adhesive mass is an acrylate or silicon adhesive mass.

19 Claims, 1 Drawing Sheet

(51) Int. Cl.
| | |
|---|---|
| B29C 65/54 | (2006.01) |
| B29C 70/54 | (2006.01) |
| C08G 18/80 | (2006.01) |
| C08F 220/18 | (2006.01) |
| C08G 18/62 | (2006.01) |
| C09J 7/24 | (2018.01) |
| C09J 133/06 | (2006.01) |
| C09J 5/02 | (2006.01) |
| C09J 175/04 | (2006.01) |
| C09J 7/38 | (2018.01) |
| B32B 27/08 | (2006.01) |
| B32B 27/30 | (2006.01) |
| C08J 5/12 | (2006.01) |
| C08J 5/24 | (2006.01) |
| B29K 33/04 | (2006.01) |

(52) U.S. Cl.
CPC ...... *B29C 66/1122* (2013.01); *B29C 66/3034* (2013.01); *B29C 66/721* (2013.01); *B29C 66/73756* (2013.01); *B29C 66/73941* (2013.01); *B29C 70/543* (2013.01); *B32B 27/08* (2013.01); *B32B 27/308* (2013.01); *C08F 220/18* (2013.01); *C08G 18/6216* (2013.01); *C08G 18/80* (2013.01); *C08J 5/128* (2013.01); *C08J 5/24* (2013.01); *C09J 5/02* (2013.01); *C09J 7/24* (2018.01); *C09J 7/243* (2018.01); *C09J 7/385* (2018.01); *C09J 133/066* (2013.01); *C09J 175/04* (2013.01); *B29C 65/542* (2013.01); *B29C 70/542* (2013.01); *B29K 2033/04* (2013.01); *C08G 2170/40* (2013.01); *C08J 2433/06* (2013.01); *C09J 2301/122* (2020.08); *C09J 2400/163* (2013.01); *C09J 2423/046* (2013.01); *C09J 2423/106* (2013.01); *C09J 2427/006* (2013.01); *C09J 2433/00* (2013.01); *C09J 2483/00* (2013.01)

(58) Field of Classification Search
CPC .............. B29C 66/3034; B29C 66/721; B29C 66/73756; B29C 66/73941; C08J 5/24; C09J 5/02; C09J 7/243; C09J 7/385; C09J 7/24

USPC .... 156/157, 242, 247, 249, 290, 295, 307.1, 156/500, 501
See application file for complete search history.

(56) References Cited

U.S. PATENT DOCUMENTS

| | | | |
|---|---|---|---|
| 4,595,725 A * | 6/1986 | Hess | C08G 18/686 524/90 |
| 5,413,661 A | 5/1995 | Spengler | |
| 5,487,853 A | 1/1996 | Buckley | |
| 5,776,572 A | 7/1998 | Lipson | |
| 5,843,354 A * | 12/1998 | Evans | B29C 70/345 264/136 |
| 6,831,114 B2 | 12/2004 | Husemann et al. | |
| 10,696,872 B2 | 6/2020 | Bernt et al. | |
| 2002/0022422 A1* | 2/2002 | Waldrop, III | B29C 70/443 442/179 |
| 2007/0213464 A1 | 9/2007 | Zollner et al. | |
| 2008/0160248 A1 | 7/2008 | Jacobsen et al. | |
| 2008/0202663 A1 | 8/2008 | Behrens et al. | |
| 2012/0107129 A1 | 5/2012 | Kulenkampff et al. | |
| 2012/0312469 A1* | 12/2012 | Stiesdal | B29C 33/68 156/289 |
| 2013/0126090 A1 | 5/2013 | Huseman et al. | |
| 2015/0024199 A1 | 1/2015 | Morimoto et al. | |
| 2015/0056433 A1* | 2/2015 | MacAdams | C09J 163/04 428/221 |
| 2018/0282585 A1 | 10/2018 | Bernt et al. | |
| 2019/0030828 A1 | 1/2019 | Bernt et al. | |
| 2019/0040284 A1 | 2/2019 | Bernt et al. | |

FOREIGN PATENT DOCUMENTS

| | | |
|---|---|---|
| DE | 10256511 A1 | 6/2004 |
| DE | 102006011113 A1 | 9/2007 |
| EP | 1262534 A2 | 12/2002 |
| EP | 1964902 A1 | 9/2008 |
| EP | 2298843 A1 | 3/2011 |
| EP | 2602097 A2 | 6/2013 |
| EP | 2832809 A1 | 2/2015 |
| JP | H02200420 A | 8/1990 |
| JP | 07331219 | 12/1995 |
| JP | 2003-193005 A | 7/2003 |
| WO | 2015014646 A1 | 2/2015 |

OTHER PUBLICATIONS

Written Opinion of the International Searching Authority for corresponding application PCT/EP2016/071091 dated Jan. 5, 2017 (English translation not available).
Donatas Satas: "Handbook of Pressure Sensitive Adhesive Technology" by (Van Nostrand, New York 1989, pp. 444 to 514).
International Search Report dated Nov. 4, 2016, dated Nov. 17, 2016 for PCT/EP2016/071091.
English translation of International Search Report dated Nov. 4, 2016, dated Nov. 17, 2016 for PCT/EP2016/071089.
Written Opinion dated Dec. 7, 2016 for PCT/EP2016/071092. (English Translation).
International Search Report dated Dec. 7, 2016, in connection with PCT International Application No. PCT/EP2016/071092.
Written Opinion dated Dec. 7, 2016, in connection with PCT International Application PCT/EP2016/071092.

* cited by examiner

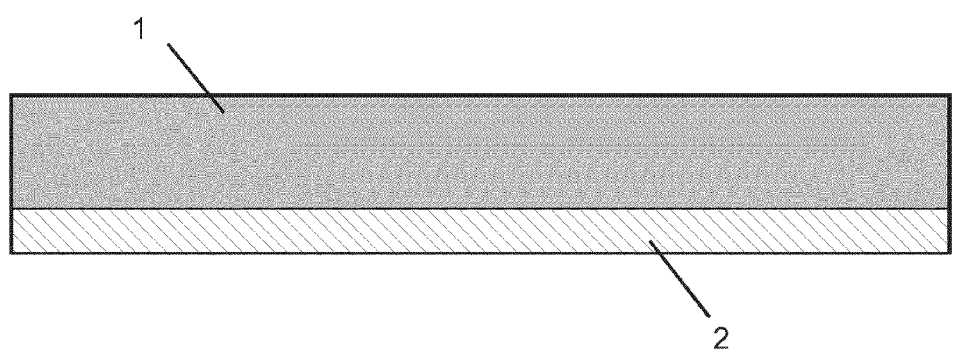

METHOD FOR JOINING TWO FIBRE-REINFORCED PLASTIC COMPONENTS

This application is a § 371 U.S. National stage of PCT International Patent Application No. PCT/EP2016/071091, filed Sep. 7, 2016, which claims foreign priority benefit of German Application No. DE 10 2015 217 310.0, filed Sep. 10, 2015, the disclosures of each of which patent applications are incorporated herein by reference.

The present invention relates to a method for joining two fiber-reinforced plastic components.

Numerous composite components, in some cases having complex geometrical structures, are produced by introducing curable material such as epoxy resins or polyester resins, for example, into a mold, and subsequently curing this material.

The most widespread process is that of vacuum-assisted resin transfer molding (VARTM), also referred to as vacuum infusion or simply just resin infusion process. In this process a laid scrim of fiber mats (glass or carbon fiber, for example) is brought into a vacuum (usually enclosed in a vacuum bag) and is impregnated, as a result of the subatmospheric pressure, with a resin/curing agent mixture (matrix, usually epoxide-based). This mixture is cured commonly at elevated temperatures (approximately 70 to 120° C.) for several hours.

Another known process is that of RTM (Resin Transfer Molding).

Resin transfer molding is a process for producing shaped parts from thermosets and elastomers. In comparison to compression molding, the molding composition in this case is injected by means of a piston from a usually heated upstream chamber by way of runners into the mold cavity, in which it cures on exposure to heat and pressure.

The molding compound used may comprise formaldehyde resins (phenolic resins or amino resins) and reactive resins (polyesters such as PET or epoxy resins) with small filler particles and elastomers.

At the start of a cycle, a preplastified and metered molding composition is present in the upstream chamber. The mold is first closed. The molding component is then injected into the mold and left in the mold for a certain time. During this "residence time", the molding composition undergoes reaction or vulcanization. This time is dependent on a variety of factors (resin type, filler, processing pressure, and processing temperature). When the residence time has ended, the mold can be opened. The molding composition introduced beforehand is now solid (fully cured) and is henceforth referred to as a molding. It can then be demolded from the mold. This is followed by the cleaning of the mold, and a new cycle can begin.

The amount of the molding composition required during injection and subsequent compression ought to always be greater in this case than the volume of the eventual molding, so that the mold is fully filled. This guarantees that the molding is formed completely and that no air is pressed in. The excess, residual molding compound in the upstream chamber, also known as residue, must be removed before the start of the new cycle, and replaced by new molding composition.

In order to prevent air inclusions, the cavity (hollow molding space) is usually evacuated as well.

Known types of mold include solid molds, soft molds, and mixed molds.

Injection resins used are resins which possess a low viscosity. Flow resistance therefore remains low when the material flows through the mold, and the filling process requires smaller pressure differences. Reactive resins for RTM processes are marketed as special-purpose injection resins, consisting of a resin component and a curing component. Low-reactivity resin systems can be mixed even prior to infusion. Where high-reactivity resin systems are to be used, resin and curing agent may not be mixed until they are directly in the infusion line or in the mold. In this way, shorter cycle times are possible. Processes wherein the injection resin components are not mixed until immediately prior to injection are known as RIM (Reaction Injection Molding) processes.

Further details can be found in the Römpp chemical encyclopedia, and specifically under the keyword "Spritzgießen" [Injection molding] (2013 Georg Thieme Verlag, document number RD-19-03499, most recent update: July 2011).

In the aircraft industry, the demands made of the components produced are significantly greater than, for example, in the wind industry. These components are required to have virtually perfect uniformity, including, for example, the absence of air bubbles. In order to achieve this, the component is brought into an autoclave for curing and homogenizing, where it spends 24 hours at ~230° C. In addition, the pressure in the autoclave is ~17 bar (in addition to the 1 bar underpressure in the vacuum bag of the component, therefore, the component is subject to an overall pressure of 18 bar). The component is then ready for further processing.

There are a wide variety of different ways of joining a plurality of individual parts to form an overall part. A common method, for example, is the "mechanical" joining of components by means of screws, bolts or the like. The drawback of this method is that for the accommodation of bolts, screws, etc., there must always be a hole present, which is either drilled or is implemented when the part is actually being constructed. The hole or the bore, or else the subsequent connection point, always represent a weak point in the component. This means that in the case of mechanical loading, the connection point is stressed particularly strongly and may exhibit wear. Especially in the aircraft industry, a weak point of this kind is unacceptable.

In order to resolve this problem, adhesive bonds are increasingly being used. Bonding here takes place by means of the epoxy resin which is also used for constructing the individual parts. If, however, one were to bond two completed components (consisting in turn of a resin matrix with embedded glass fibers or carbon fibers, with the embedded glass or carbon fibers being fully surrounded by resins) to one another, the cured resin surfaces of the components would be bonded to one another.

Since this bond again represents a weak point, the "bare" fibers of both surfaces are bonded together with a resin. The fibers are enveloped in a chemical agent (known as the size), and so the attachment of resin to fiber (or size) is a virtually "indestructible bond". Nevertheless, remedies must be adopted here in order to expose the "bare" fibers. A common method, for example, is that of using laser ablation to erode the uppermost layer of resin down to the fibers.

The laser ablation method is much more precise and less destructive than simple abrading. Another advantage for the strength of the subsequent bond is the surface activated by the laser, at which subsequent bonding is made easier.

Nevertheless, the equipment required is also very expensive, and a great deal of attention must be paid to workplace protection because of possible laser scattering.

Furthermore, there are various other known methods which allow subsequent depletion of the matrix material, but do not lead to the erosion or damage of the fibers that are to be exposed. Also conceivable here, for example, is a chemical etching procedure, with the disadvantages thereof being obvious: in particular, the workplace protection (to counter liquids or even to counter gaseous compounds which form, and also an extra encapsulated room) is not insignificant, and often entails immense costs.

It is an object of the present invention to specify a method for joining two fiber-reinforced plastic components, this method operating without special measures which must be taken in order to comply with workplace protection, in order to protect workers against liquids and/or gases and also against any (respirable) particles that may occur.

This object is achieved by means of a method as specified and described herein. Also described are advantageous onward developments of the subject matter of the invention.

The invention relates accordingly to a method for joining two fiber-reinforced plastic components, comprising the following steps:
   producing a first fiber-reinforced plastic component by introducing a laid scrim of fiber mats which is impregnated with a resin/curing agent mixture, which in turn is subsequently cured; that part of the surface of the first fiber-reinforced plastic component which is later to be bonded to the second fiber-reinforced plastic component (also called joining surface below) is masked with an adhesive tape before the fiber mats are impregnated with the resin/curing agent mixture,
   producing a second fiber-reinforced plastic component according to the steps specified above; that part of the surface of the second fiber-reinforced plastic component that is later to be bonded to the first fiber-reinforced plastic component is likewise masked with an adhesive tape before the fiber mats are impregnated with the resin/curing agent mixture,
   removing the adhesive tapes from the two completed fiber-reinforced plastic components,
   contacting the two joining surfaces,
   introducing a resin/curing agent mixture between the two joining surfaces,
   curing the resin/curing agent mixture.

The adhesive tape has a carrier film which bears on one side an applied adhesive composition, more particularly a self-adhesive composition.

The carrier film of the adhesive tape consists of fluoropolymers, of polyethylene polymers, of unoriented polypropylene, or of metal, and the adhesive composition is an acrylate or silicone adhesive composition.

For the fiber mats, glass fibers or carbon fibers are used with preference.

The fiber mats are usually laid scrims made from untwisted and untangled or from twisted or tangled filaments. The filaments consist in general of high-tenacity fibers with low elongation at break.

For the purposes of this invention, a filament refers to a bundle of parallel, linear individual fibers, often also referred to in the literature as multifilament. This fiber bundle may optionally be inherently strengthened by twisting, the filaments then said to be spun or twisted filaments. Alternatively, the fiber bundle may be given intrinsic strengthening by entanglement using compressed air or water jets.

The concept of the method of the invention is that the bare fibers (or the location at which subsequent joining to another component is to take place) are masked by the adhesive tape prior to the resin infusion process. Subsequently, as described above, the resin infusion process is carried out, preferably with subsequent autoclaving. Following removal of the component from the autoclave preferably used, and from the vacuum bag likewise preferably used, the applied adhesive tape is removed. Because the adhesive tape was adhered directly to the fibers, the fibers are visible again at the free surface after the adhesive tape has been removed. This means that the adhesive tape has masked these fibers throughout the procedure.

The demands made of a relevant adhesive tape are exacting, since the adhesive tape is required to withstand the conditions that are usual in the production of fiber-reinforced plastic components. The adhesive tape ought to "withstand" 230° C. for 24 hours in the absence of air (i.e., in the vacuum bag) in an autoclave at 18 bar. In addition, the tape must be able to be removed without residue.

Residues of whatever kind critically affect any subsequent effective bonding. Additionally, during the infusion process, the adhesive tape receives a flow of resin and curing agent, which cures directly at the boundary layer to the adhesive tape.

The adhesive tape must not influence the properties of the composite material (by migration of the constituents or the like).

Both carrier and adhesive composition must therefore withstand the high temperature, the duration, and the pressure.

The carrier film preferably comprises to an extent of 90 wt %, more preferably 95 wt %, fluoropolymers (based on the overall composition of the carrier film).

With further preference, the polymers forming the carrier film consist to an extent of 100 wt % of fluoropolymers. Additionally, optionally, the additives outlined below may have been added to the fluoropolymers. These additives—as stated—are not mandatory, but may also not be used.

Fluoropolymers used are in particular, PTFE (polytetrafluoroethylene (Teflon)), PFA (perfluoroalkoxy polymers) or FEP (poly(tetrafluoroethylene-co-hexafluoropropylene)), or mixtures of the stated fluoropolymers, since they are known to be suitable for high-temperature applications.

ETFE (poly(ethylene-co-tetrafluoroethylene)), ECTFE (copolymer consisting of ethylene and chlorotrifluoroethylene) or PVDF (poly(1,1-difluoroethene)) or mixtures of the stated fluoropolymers, are also suitable, though less preferred.

Under certain circumstances, however, these fluoropolymers have a low melting point/decomposition point, and in that case it is possible for highly toxic decomposition substances to form, and for the film to undergo severe contraction.

Fluoropolymers or fluorine-containing polymers are understood in the context of this invention, and also generally, to encompass not only fluorine-containing polymers having carbon atoms exclusively but also those having heteroatoms in the main chain. Representatives of the first group are homopolymers and copolymers of olefinically unsaturated fluorinated monomers.

The fluoropolymers resulting from these monomers are classified in the categories of polytetrafluoroethylene, fluorothermoplastics, fluorinated rubbers, and the fluoroelastomers obtained therefrom by vulcanization. The most important representatives of the fluoropolymers having heteroatoms in the main chain are polyfluorosiloxanes and polyfluoroalkoxyphosphazenes.

PTFE denotes fluoropolymers composed of tetrafluoroethene monomers.

PFA denotes copolymers having moieties such as

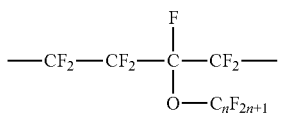

as basic units [poly(tetrafluoroethylene-co-perfluoroalkyl vinyl ether)]. PFAs result from the copolymerization of tetrafluoroethene and perfluoroalkoxy vinyl ethers (for example, perfluorovinyl propyl ether, n=3).

FEP, also called fluorinated ethylene-propylene copolymer, denotes copolymers of tetrafluoroethene and hexafluoropropene.

PVF is a polymer prepared from vinyl fluoride (polyvinyl fluoride).

PCTFE is a polymer composed of chlorotrifluoroethylene (polychlorotrifluoroethylene).

ETFE is a fluorinated copolymer consisting of chlorotrifluoroethylene monomers or else of tetrafluoroethylene and ethylene monomers.

ECTFE is a copolymer consisting of ethylene and chlorotrifluoroethylene.

PVDF denotes fluoropolymers preparable from 1,1-difluoroethene (vinylidene fluoride).

The fluoropolymers are preferably not mixed with further polymers such as olefinic polymers such as homopolymers or copolymers or olefins such as ethylene, propylene or butylene (the term "copolymer" is to be understood in such a way that it includes terpolymers), polypropylene homopolymers or polypropylene copolymers, including the block (impact) and random polymers, or polyesters such as, in particular, polyethylene terephthalate (PET), polyamides, polyurethanes, polyoxymethylene, polyvinyl chloride (PVC), polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES), polyimide (PI), polyarylene sulfides and/or polyarylene oxides.

The polymers for forming the carrier film may be present in pure form or in blends with additives such as antioxidants, light stabilizers, antiblocking agents, lubricating and processing assistants, fillers, dyes, pigments, blowing agents, or nucleating agents.

The film preferably has none of said additives.

Additionally suitable are carriers comprising a metal foil, made more particularly of aluminum.

Additionally suitable as carrier film, surprisingly, is polyethylene (PE), at least in the case of the preferred implementation of the method under vacuum. This is surprising because, for example, HDPE possesses a melting point of ~130 to 145° C. and decomposes at temperatures of 230° C. In the absence of air, this decomposition process appears not to occur. The PE melts, with the melt remaining fixed in position by the vacuum bag during the autoclaving process, and solidifying again when the temperature is reduced.

Preference is given to using, moreover, HDPE, i.e., polymer chains with little branching and therefore with a high density of between 0.94 g/cm$^3$ and 0.97 g/cm$^3$, LDPE, i.e., highly branched polymer chains, therefore with a low density of between 0.915 g/cm$^3$ and 0.935 g/cm$^3$; and/or LLDPE, i.e. a linear low-density polyethylene whose polymer molecule contains only short branches. These branches are prepared by copolymerization of ethene and higher α-olefins (typically butene, hexene or octene).

The fraction of polyethylene in HDPE, LDPE and LLDPE is preferably 99 wt % or more.

The carrier film preferably comprises polyethylene polymers to an extent of 95 wt % (based on the overall composition of the carrier film).

The polymers forming the carrier film preferably consist to an extent of 100 wt % of polyethylene. The additives outlined later on, may, optionally additionally have been added to the polyethylene polymers. These additives—as stated—are not mandatory, but instead may also not be used.

In one variant of the invention, the carrier material used is unoriented polypropylene.

The carrier film preferably comprises polypropylene polymers to an extent of 95 wt % (based on the overall composition of the carrier film).

Furthermore, the polymers forming the carrier film consist of polypropylene to an extent of 100 wt %. The additives outlined below may, optionally, additionally have been added to the polypropylene polymers. These additives are—as stated—not mandatory, but instead may also not be used.

According to one preferred embodiment, the carrier film consists of a single film ply.

According to one preferred embodiment, the thickness of the carrier film is between 30 and 200 μm, preferably between 40 and 100 μm, more preferably between 40 and 60 μm.

The adhesive composition applied on the carrier film is preferably a pressure-sensitive adhesive composition, i.e., an adhesive composition which provides a durable bond to almost any substrate even under relatively light pressure and is redetachable from the substrate after use essentially without leaving a residue. A pressure-sensitive adhesive composition is permanently tacky at room temperature, i.e. has a sufficiently low viscosity and a high initial tack, so it will wet the surface of the particular substrate by a minimal pressure. The adherability of the adhesive composition rests on its adhesive properties, and the redetachability on its cohesive properties.

As a temperature-stable adhesive composition, according to one advantageous variant of the method, silicone adhesive compositions are employed, since they are known fundamentally to be outstandingly suitable for high-temperature applications and for residue-free removability.

The silicone-based adhesive compositions are preferably used with a carrier composed of a polyethylene film.

Additionally suitable are acrylate-based adhesive compositions. The acrylate-based adhesive compositions are preferably used with a carrier composed of a polyethylene film.

"Silicon-based" or "acrylate-based" here means that the polymers forming the basic framework of the adhesive composition (in other words without tackifier resins, plasticizers, or other adjuvants and additives) consist of silicones or of acrylates, respectively, to an extent of at least 50 wt %, preferably 75 wt %, more preferably to an extent of 90 wt %.

Preference is given, further, to using a polyacrylate which can be traced back to the following reactant mixture, comprising monomers of the following composition:

A1) acrylic esters and/or methacrylic esters of the following formula

where $R^1$=H or $CH_3$ and $R^2$ is an alkyl chain having 1 to 14 carbon atoms, with a fraction of 55 to 98 wt %, preferably with 70%, A2) acrylates and/or methacrylates whose alcohol component contains at least one primary hydroxyl or carboxyl group, and/or vinyl compounds which are copolymerizable with acrylates and which contain at least one primary hydroxyl or carboxyl group, with a fraction of 1 to 20 wt %, A3) polyfunctional isocyanate crosslinkers which are blocked with thermally reversible protecting groups, with a fraction of 1 to 10 wt %, A4) and, if the fractions of A1), A2) and A3) do not add up to 100 wt %, olefinically unsaturated monomers having functional groups, with a fraction of 0 to 15 wt %.

The monomers are preferably selected such that the resulting polymers can be used as pressure-sensitive adhesive compositions at room temperature, more particularly such that the resulting polymers have properties of pressure-sensitive adhesiveness in accordance with the "Handbook of Pressure Sensitive Adhesive Technology" by Donatas Satas (van Nostrand, N.Y. 1989, pages 444 to 514).

These acrylate adhesive compositions are particularly advantageous; adding so-called blocked isocyanates to them induces a subsequent crosslinking of the adhesive composition.

This operation can be taken to the point that the adhesive composition undergoes complete crosslinking right through, so becoming hard, and allowing the adhesive tape to be removed without residue from the surface.

The terms "blocked isocyanates" and "masked isocyanates" describe the circumstance whereby addition compounds of highly reactive isocyanates with alcohols (urethanes) and with amines (ureas) are able to release these isocyanates again at higher temperatures. Blocked isocyanates are formed by reaction of isocyanates with H-acidic compounds. They are thermally unstable and undergo decomposition (deblocking) to isocyanates again at above about 120° C. They react further only on heating, hence allowing the timing of the reaction to be controlled more effectively. Blocked isocyanates are used as flexibilizers in epoxide systems. These products are based on flexible polyurethane prepolymers which are blocked with phenol. Deblocking takes place by reaction with the amine hardener, forming a urea which is incorporated into the epoxide network and functions as a soft segment.

Blocking agents with various deblocking temperatures are used. The temperature, however, is also dependent on the chemical structure of the isocyanate and on the volatility of the blocking agent. Tin compounds and bismuth compounds lower the deblocking temperature by a few degrees Celsius.

The blocked isocyanates (BI) are able to function in a two-fold fashion: on the one hand, there are free isocyanate groups in the molecule, but they are shielded by very bulky side groups to such an extent that they do not (cannot) react at room temperature or slightly elevated temperatures. Only at a high temperature and with a greater ease of rotatability within the molecule and with high diffusion rates do these groups acquire reactivity and are able to lead to the crosslinking of the composition. On the other hand, the isocyanate groups are converted by means of a protecting group into different compounds, and so are blocked and unreactive. By raising the temperature above a "trigger temperature", the protecting groups are eliminated and the free isocyanates are present, and are able in turn to lead to crosslinking of the adhesive composition.

Ultimately suitable for this variant are acrylate compositions which possess suitable attachment sites for isocyanates (for example, acrylic acid groups or hydroxyacrylates). It is preferred in this case to operate with the blocked isocyanates in stoichiometric correspondence to the crosslinker groups, in order to suppress unwelcome effects (transesterification, for example).

With particular advantage, the adhesive compositions indicated above are combined with a carrier composed of a polyethylene film.

Use is further made, preferably, of a polyacrylate which can be traced back to the following reactant mixture, comprising monomers of the following composition:

A1) acrylic esters and/or methacrylic esters of the following formula

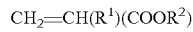

where $R^1$=H or $CH_3$ and $R^2$ is an alkyl chain having 1 to 14 carbon atoms, with a fraction of 75 to 98 wt %, A2) acrylates and/or methacrylates whose alcohol component contains at least one primary hydroxyl or carboxyl group, and/or vinyl compounds which are copolymerizable with acrylates and which contain at least one primary hydroxyl or carboxyl group, with a fraction of 1 to 5 wt %, A3) acrylates and/or methacrylates whose alcohol component contains at least one epoxy group, and/or vinyl compounds which are copolymerizable with acrylates and which contain at least one epoxy group, with a fraction of 1 to 5 wt %, A4) and, if the fractions of A1), A2) and A3) do not add up to 100 wt %, olefinically unsaturated monomers having functional groups, with a fraction of 0 to 15 wt %.

The monomers are preferably selected such that the resulting polymers can be used as pressure-sensitive adhesive compositions at room temperature, more particularly such that the resulting polymers have properties of pressure-sensitive adhesiveness in accordance with the "Handbook of Pressure Sensitive Adhesive Technology" by Donatas Satas (van Nostrand, N.Y. 1989, pages 444 to 514).

These polyacrylates contain free acrylic acid groups, but also polymerized glycidyl methacrylate. The latter functions as a reactive group for the free acrylic acid groups and leads to further crosslinking of the polymer. This goes so far that the adhesive composition undergoes complete filming (that is, becomes hard) and no longer has any perceptible finger tack. As a result of the filming process, it is now possible to remove the adhesive tape from the surface without residue.

With particular advantage, the adhesive compositions indicated above are combined with a carrier composed of a polyethylene film.

Use is further made, preferably of a polyacrylate which can be traced back to the following reactant mixture, comprising monomers of the following composition:

A1) acrylic esters and/or methacrylic esters of the following formula

where $R^1$=H or $CH_3$ and $R^2$ is an alkyl radical having 1 to 14 carbon atoms, with a fraction of 50 to 95 wt %, A2) acrylates and/or methacrylates whose alcohol component contains at least one primary hydroxyl or carboxyl group, and/or vinyl compounds which are copolymerizable with acrylates and which contain at least one primary hydroxyl or carboxyl group, with a fraction of 5 to 30 wt %, A3) acrylates and/or methacrylates whose alcohol component contains at least one epoxy group, and/or vinyl compounds which are copolymerizable with acrylates and which contain at least one epoxy group, with a fraction of 0 to 5 wt %, A4) and, if the fractions of A1), A2) and A3) do not add up to 100 wt %, olefinically unsaturated monomers having functional groups, with a fraction of 0 to 15 wt %.

The alkyl radical may be linear, branched or cyclic.

The monomers are preferably selected such that the resulting polymers can be used as pressure-sensitive adhesive compositions at room temperature, more particularly such that the resulting polymers have properties of pressure-sensitive adhesiveness in accordance with the "Handbook of Pressure Sensitive Adhesive Technology" by Donatas Satas (van Nostrand, N.Y. 1989, pages 444 to 514).

The polyacrylates described are acrylic acid-free. They are highly transparent. The particular feature of this kind of adhesive compositions is that they undergo post-crosslinking, or filming, at high temperatures. This happens primarily as a result of the copolymerized 2-hydroxyethyl acrylate. At elevated temperatures, the hydroxyl group is able to react intramolecularly and intermolecularly with the ester groups of the other monomers, in transesterification reactions. These additional nodal points in the polymer structure lead to a drastically increased crosslinking of the adhesive composition. This goes so far that the adhesive composition undergoes filming and loses any tack. This is the guarantee that the adhesive composition can be removed from the surface without residue.

Preferred are olefinically unsaturated monomers having functional groups selected from the following listing: hydroxyl, carboxyl, sulfonic-acid or phosphonic-acid groups, acid anhydrides, epoxides, amines.

Particularly preferred examples of these monomers are itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

With particular advantage the adhesive compositions indicated above are combined with a carrier composed of a polyethylene film.

For further improvement of the properties, the adhesive compositions formulations may optionally be blended with light stabilizers or with primary and/or secondary aging inhibitors. Aging inhibitors used may be the products based on sterically hindered phenols, phosphites, thiosynergists, sterically hindered amines or UV absorbers. Preference is given to using primary antioxidants such as, for example, Irganox 1010 or Irganox 254, alone or in combination with secondary antioxidants such as, for example, Irgafos TNPP or Irgafos 168. The aging inhibitors here can be used in any desired combination with one another, and mixtures of primary and secondary antioxidants in combination with light stabilizers such as Tinuvin 213, for example, exhibit particularly good aging-inhibiting effects.

Having proven particularly advantageous are aging inhibitors which combine a primary antioxidant with a secondary antioxidant in one molecule. These aging inhibitors are cresol derivatives whose aromatic ring is substituted at any two different locations, preferably in ortho and meta positions to the OH group, by thioalkyl chains, where the sulfur acid may also be joined by one or more alkyl chains to the aromatic ring of the cresol building block. The number of carbon atoms between the aromatic moiety and the sulfur atom may be between 1 and 10, preferably between 1 and 4. The number of carbon atoms in the alkyl side chain may be between 1 and 25, preferably between 6 and 16. Particularly preferred here are compounds of the type of 4,6-bis(dodecylthiomethyl)-o-cresol, 4,6-bis(undecylthiomethyl)-o-cresol, 4,6-bis(decylthiomethyl)-o-cresol, 4,6-bis(nonylthiomethyl)-o-cresol or 4,6-bis(octylthiomethyl)-o-cresol. Aging inhibitors of these kinds are available for example from Ciba Geigy under the name Irganox 1726 or Irganox 1520.

The amount of aging inhibitor or aging-inhibitor package added ought to be in a range between 0.1 and 10 wt %, preferably in a range between 0.2 and 5 wt %, more preferably in a range between 0.5 and 3 wt %, based on the overall composition of the adhesive.

To improve the processing properties it is possible for the adhesive compositions to be admixed, for formulation, with further customary process auxiliaries such as rheological additives (thickeners), defoamers, de-aerating agents, wetting agents or flow control agents. Suitable concentrations are in the range from 0.1 to 5 wt %, based on the overall composition of the adhesive.

Fillers (reinforcing or nonreinforcing) such as silicon dioxides (spherical, acicular, lamellar, or irregular, such as the fumed silicas), glass in the form of solid or hollow beads, microballoons, calcium carbonates, zinc oxides, titanium dioxides, aluminum oxides or aluminum oxide hydroxides may serve both for adjusting the processing qualities and for adjusting the technical adhesive properties. Suitable concentrations are in the range from 0.1 up to 20 wt %, based on the overall composition of the adhesive.

The anchoring is customarily strong enough to allow an adhesive tape of this kind to be unwound easily from a roll, without the anchoring causing the adhesive composition to break and resulting in so-called transfer of the adhesive composition (in which case the adhesive composition is located on the reverse of the carrier).

According to one preferred embodiment, the coat weight of the adhesive composition on the carrier film is between 10 and 50 g/m$^2$; preferably between 20 and 40 g/m$^2$, more preferably between 25 and 35 g/m$^2$.

The pressure-sensitive adhesive composition may be produced and processed from solution, from dispersion, and from the melt. Preferred preparation and processing procedures are accomplished from solution and also from the melt. Particularly preferred is the manufacture of the adhesive composition from the melt, in which case, in particular, batch methods or continuous methods may be used. The continuous manufacture of the pressure-sensitive adhesive composition by means of an extruder is particularly advantageous.

The pressure-sensitive adhesive composition thus produced can then be applied to the carrier by the methods that are common knowledge. In the case of processing from the melt, this may involve application methods using a nozzle or a calender.

In the case of processes from solution, coating operations with doctor blades, knives or nozzles are known, to name but a few.

In order to increase the adhesion between the adhesive composition and the carrier film, the carrier film may have its surface energy enhanced by undergoing corona treatment or plasma treatment, this representing a very preferred variant.

The use of a primer layer between carrier film and adhesive composition is advantageous for the purpose of improving the adhesion of the adhesive composition on the film and therefore for enhancing the residue-free removability after the application.

Etching of the film is advantageous, moreover, in order to allow the adhesive composition to be anchored.

The general expression "adhesive tape" for the purposes of this invention encompasses all sheet-like constructs such as two-dimensionally extended films or film portions, tapes of extended length and limited width, tape portions and the like, ultimately also die cuts.

The adhesive tape may be produced in the form of a roll, in other words wound up on itself in the form of an Archimedean spiral, or else may be lined on the adhesive side with release materials such as siliconized paper or siliconized film (also known as liners to the skilled person), which are removed from the layer of adhesive composition prior to use.

A suitable release material is preferably a nonlimiting material such as a polymeric film or a highly sized long-fibered paper.

The reverse side of the adhesive tape may carry an applied reverse-side lacquer, in order to exert a favorable influence over the unwind properties of the adhesive tape wound to the Archimedean spiral. This reverse-side lacquer may for that purpose be equipped with silicone or fluorosilicone compounds and also with polyvinylstearylcarbamate, polyethyleneimine stearylcarbamide or organofluorine compounds as adhesive substances or for nonstick coating.

The adhesive tapes in particular have running lengths of 1000 to 30.000 m. Typical widths selected for the rolls are 10, 15, 19, 25 and 30 mm.

From the standpoints of technology and economics, the advantages of the method of the invention are immense. The method represents one alternative for obtaining bare fibers on the surface of a fiber-reinforced plastic component, without having to erode the surface or the matrix material chemically or physically subsequent to the completion of the component. The bare fibers of the laid fiber scrim (mono- or multifilament), and the location at which joining is subsequently to take place to another component, are bonded with the adhesive tape prior to the resin infusion process. Subsequently, as described above, the resin infusion process is carried out with the preferred subsequent autoclaving. After the component has been removed from the autoclave and from the vacuum bag, the applied adhesive tape is removed without problems (without residue). Since the adhesive tape has been adhered directly to the fibers, they can be seen at the surface again after removal of the adhesive tape. In other words, the adhesive tape has masked these fibers throughout the entire operation. The bonded fibers do not receive a flow of resin, and so the masked fibers are not surrounded by cured resin.

The component thus manufactured can be utilized in a further adhesive bonding operation without further readying and/or processing.

The method of the invention is quick, reliable, clean and efficient.

In the case of the known methods, particularly of laser ablation, there is a need first of all for capital investments to be made in corresponding laser equipment and the associated control instrumentation. Furthermore, high-energy laser radiation in particular (and, in the worst case, invisible laser radiation as well) is very dangerous and, in the event of the smallest reflections into the eyes, can lead to cases of blinding. It is therefore necessary to invest money into workplace protection as well. This begins with a complete encapsulation of the system. This system must be sited in a separate, absolutely impervious room (with walls that have been made extra hard in certain circumstances). Moreover, it is necessary to remove any object that may lead to reflections. Furthermore, all of the products (particulate, liquid, gaseous) must be drawn off/removed efficiently and disposed of efficiently. An expense of this kind of protection, and the necessary capital investments, are themselves associated with very high costs. Occasionally, however, even laser treatment, or an abrading or etching operation, lasts a long time, and downtimes are always associated with further costs, which can be avoided by virtue of the method of the invention.

The invention is elucidated in more detail below with a number of examples, without hereby wishing to restrict the invention in any way.

EXAMPLES

The vacuum and autoclaving operation as used customarily in the production of composite components is simulated by means of a vacuum heating press. The press compartment can be evacuated (vacuum) and the jaws of the press are heatable (temperature). In addition, a sample for analysis can be pressurized by the jaws of the press (pressure). Here it is possible to investigate the residue-free redetachability of the adhesive tape on a variety of substrates.

Additionally, glass/carbon fibers can be bonded with the adhesive tape, and impregnated with resin/curing agent, and cured. The residue-free redetachability on original substrate is therefore investigated.

Example 1

30 g/m$^2$ film-forming acrylate composition
  20 wt % isobornyl acrylate
  20 wt % 2-hydroxyethyl acrylate
  40 wt % butyl acrylate
  20 wt % ethylhexyl acrylate
50 µm HDPE film (100 wt % HDPE)
Activation of the carrier by corona treatment Counterexample 1

30 g/m$^2$ film-forming acrylate composition consisting of
  20 wt % isobornyl acrylate
  20 wt % 2-hydroxyethyl acrylate
  40 wt % butyl acrylate
  20 wt % ethylhexyl acrylate
50 µm BOPP film
Activation of the carrier by corona treatment The adhesive tape based in accordance with example 1 can be removed without residue according to the given conditions of 230° C., 24 h and 18 bar pressure.

In the case of counter example 1, it is observed when detaching the adhesive tape that the carrier cannot be removed in one piece, since it has become brittle.

Example 2

30 g/m$^2$ film-forming acrylate composition consisting of
  48.5 wt % butyl acrylate
  48.5 wt % ethylhexyl acrylate
  1 wt % acrylic acid
  2 wt % glycidyl methylacrylate
50 µm PTFE (polytetrafluoroethylene) film (100 wt %)
Activation of the carrier by corona treatment

Counterexample 2

30 g/m² film-forming acrylate composition consisting of
48.5 wt % butyl acrylate
48.5 wt % ethylhexyl acrylate
1 wt % acrylic acid
2 wt % glycidyl methylacrylate
50 μm PET (polyethylene terephthalate) film (100 wt %)
Activation of the carrier by corona treatment The adhesive tape based in accordance with example 2 can be removed without residue according to the given conditions of 230° C., 24 h and 18 bar pressure.

In the case of counter example 2, it is observed when detaching the adhesive tape that the carrier cannot be removed in one piece, since it has become brittle.

Example 3

30 g/m² acrylate composition consisting of
5 wt % acrylic acid
47.5 wt % butyl acrylate
47.5 wt % ethylhexyl acrylate
3 parts by weight Desmodur BL 3475 BA/SN per 100 parts by weight of monomers
50 μm HDPE film (100 wt % HDPE)
Activation of the carrier by corona treatment

Counterexample 3

30 g/m² acrylate composition consisting of
5 wt % acrylic acid
47.5 wt % butyl acrylate
47.5 wt % ethylhexyl acrylate
3 parts by weight Desmodur BL 3475 BA/SN per 100 parts by weight of monomers
50 μm BOPP film
Activation of the carrier by corona treatment The adhesive tape based in accordance with example 3 can be removed without residue according to the given conditions of 230° C., 24 h and 18 bar pressure.

In the case of counter example 3, it is observed when detaching the adhesive tape that the carrier cannot be removed in one piece, since it has become brittle.

Elucidated in more detail below is an adhesive tape by reference to a FIGURE, without wishing thereby to cause any restriction of whatever kind.

FIG. 1 shows the adhesive tape in a lateral section.

FIG. 1 shows in a section in the transverse direction (cross section) the adhesive tape consisting of a film carrier 1, bearing on one side an applied layer of a self-adhesive coating 2.

The invention claimed is:

1. A method comprising:
providing a first fiber-reinforced plastic component comprising a first surface and further comprising a first laid scrim comprising a first fiber mat;
masking the first surface with a first adhesive tape;
impregnating the first laid scrim with a first resin/curing agent mixture;
curing the first resin/curing agent mixture;
providing a second fiber-reinforced plastic component comprising a second surface and further comprising a second laid scrim comprising a second fiber mat;
masking the second surface with a second adhesive tape;
impregnating the second laid scrim with a second resin/curing agent mixture;
curing the second resin/curing agent mixture;
removing the first adhesive tape and the second adhesive tape;
introducing a third resin/curing agent mixture between the first surface and the second surface; and
curing the third resin/curing agent mixture,
wherein:
the first adhesive tape comprises a carrier film comprising a first side;
an adhesive composition is disposed on the first side;
the carrier film comprises at least one fluoropolymer, a polyethylene, an unoriented polypropylene, or a metal; and
the adhesive composition is an acrylate-based adhesive composition or a silicone-based adhesive composition.

2. The method as claimed in claim 1, wherein the carrier film comprises the at least one fluoropolymer at a proportion of 90 wt % based on a total weight of the carrier film.

3. The method as claimed in claim 2, wherein the at least one fluoropolymer has a proportion of 95 wt % based on a total weight of the carrier film.

4. The method as claimed in claim 1, wherein the carrier film further comprises a fluoropolymer comprising a polytetrafluoroethylene (PTFE), a perfluoroalkoxy polymer (PFA), or a poly(tetrafluoroethylene-co-hexafluoropropylene (FEP), or mixtures thereof.

5. The method as claimed in claim 1, wherein the carrier film comprises the polyethylene.

6. The method as claimed in claim 5, wherein the polyethylene comprises a high-density polyethylene, a low-density polyethylene, or a linear low-density polyethylene.

7. The method as claimed in claim 1, wherein the carrier film comprises the unoriented polypropylene.

8. The method as claimed in claim 1, wherein the carrier film consists of a single film ply.

9. The method as claimed in claim 1, wherein a thickness of the carrier film is between 30 and 200 μm.

10. The method as claimed in claim 9, wherein a thickness of the carrier film is between 40 and 100 μm.

11. The method as claimed in claim 10, wherein a thickness of the carrier film is between 40 and 60 μm.

12. The method as claimed in claim 1, wherein the acrylate-based adhesive composition or the silicone-based adhesive composition is an acrylate-based pressure-sensitive adhesive or a silicone-based pressure-sensitive adhesive.

13. The method as claimed in claim 1, wherein the acrylate-based adhesive composition comprises a polyacrylate based on the following monomers:
monomer A1) at least one of an acrylic ester and a methacrylic ester of the formula $CH_2=C(R^1)(COOR^2)$, where $R^1=H$ or $CH_3$ and $R^2$ is an alkyl chain comprising 1 to 14 carbon atoms, at a fraction of 55 to 98 wt % based on the total amount of monomers (A1)-(A4);
monomer A2) at least one of an acrylate, a methacrylate, and a vinyl compound at a fraction of 1 to 20 wt % based on the total amount of monomers (A1)-(A4);
monomer A3) a polyfunctional isocyanate crosslinker which is blocked with a thermally reversible protecting group at a fraction of 1 to 10 wt % based on the total amount of monomers (A1)-(A4); and
monomer A4) if the fraction of monomers (A1), the fraction of monomers (A2), and the fraction of monomers (A3) do not add up to 100 wt %, an olefinically unsaturated monomer comprising a functional group at a fraction of 0 to 15 wt % based on the total amount of monomers (A1)-(A4), wherein:
the acrylate or the methacrylate comprises a first alcohol component comprising at least one first primary hydroxyl or at least one first carboxyl group;
the vinyl compound is copolymerizable with the acrylate or the methacrylate; and
the vinyl compound comprises at least one second primary hydroxyl or at least one second carboxyl group.

14. The method as claimed in claim 1, wherein the acrylate-based adhesive composition comprises a polyacrylate based on the following monomers:
monomer A1) at least one of an acrylic ester and a methacrylic ester of the formula $CH_2=C(R^1)(COOR^2)$, where $R^1$=H or $CH_3$ and $R^2$ is an alkyl chain comprising 1 to 14 carbon atoms, at a fraction of 75 to 98 wt % based on the total amount of monomers (A1)-(A4);
monomer A2) at least one of a first acrylate, a first methacrylate, and a first vinyl compound at a fraction of 1 to 5 wt % based on the total amount of monomers (A1)-(A4);
monomer A3) at least one of a second acrylate, a second methacrylate, and a second vinyl compound at a fraction of 1 to 5 wt % based on the weight of the total amount of monomers (A1)-(A4); and
monomer A4) if the fraction of monomers (A1), the fraction of monomers (A2), and the fraction of monomers (A3) do not add up to 100 wt %, an olefinically unsaturated monomer comprising a functional groups at a fraction of 0 to 15 wt % based on the total amount of monomers (A1)-(A4),
wherein:
the first acrylate or the first methacrylate comprises a first alcohol component comprising at least one first primary hydroxyl or at least one first carboxyl group;
the first vinyl compound is copolymerizable with the first acrylate or the first methacrylate;
the first vinyl compound comprises at least one second primary hydroxyl group or at least one second carboxyl group;
the second acrylate or the second methacrylate comprises at least one first epoxy group;
the second vinyl compound is copolymerizable with the second acrylate or the second methacrylate;
the second vinyl compound comprises at least one second epoxy group.

15. The method as claimed in claim 1, wherein the acrylate-based adhesive composition comprises a polyacrylate based on the following monomers:
monomer A1) at least one of an acrylic ester and a methacrylic ester of the formula $CH_2=C(R^1)(COOR^2)$, where $R^1$=H or $CH_3$ and $R^2$ is an alkyl chain comprising 1 to 14 carbon atoms, at a fraction of 50 to 95 wt % based on the total amount of monomers (A1)-(A4);
monomer A2) at least one of a first acrylate, a first methacrylate, and a first vinyl compound at a fraction of 5 to 30 wt % based on the total amount of monomers (A1)-(A4);
monomer A3) at least one of a second acrylate, a second methacrylate, and a second vinyl compound at a fraction of 0 to 5 wt % based on the total amount of monomers (A1)-(A4); and
monomer A4) if the fraction of monomers (A1), the fraction of monomers (A2), and the fraction of monomers (A3) do not add up to 100 wt %, an olefinically unsaturated monomer comprising a functional group at a fraction of 0 to 15 wt % based on the total amount of monomers (A1)-(A4),
wherein:
the first acrylate or the first methacrylate comprises a first alcohol component comprising at least one first primary hydroxyl or at least one first carboxyl group;
the first vinyl compound is copolymerizable with the first acrylate or the first methacrylate;
the first vinyl compound comprises at least one second primary hydroxyl group or at least one second carboxyl group;
the second acrylate or the second methacrylate comprises at least one first epoxy group;
the second vinyl compound is copolymerizable with the second acrylate or the second methacrylate;
the second vinyl compound comprises at least one second epoxy group.

16. The method as claimed in claim 1, wherein a coat weight of the adhesive composition is between 10 and 50 $g/m^2$.

17. The method as claimed in claim 16, wherein a coat weight of the adhesive composition is between 20 and 40 $g/m^2$.

18. The method as claimed in claim 17, wherein a coat weight of the adhesive composition is between 25 and 35 $g/m^2$.

19. The method as claimed in claim 1, wherein the adhesive composition comprises a self-adhesive composition.

* * * * *